US012657323B2

(12) United States Patent

Agrawal et al.

(10) Patent No.: US 12,657,323 B2

(45) Date of Patent: Jun. 16, 2026

(54) AUTOMATIC SECURE STORAGE OF CONFIDENTIAL DIGITAL CONTENT

(71) Applicant: Motorola Mobility LLC, Chicago, IL (US)

(72) Inventors: Amit Kumar Agrawal, Bangalore (IN); Panduranga Reddy Pailla, Bangalore (IN); Vijayprakash Idlur, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 27 days.

(21) Appl. No.: 18/621,536

(22) Filed: Mar. 29, 2024

(65) Prior Publication Data

US 2025/0307446 A1 Oct. 2, 2025

(51) Int. Cl.
*G06F 21/62* (2013.01)

(52) U.S. Cl.
CPC ............................... *G06F 21/6218* (2013.01)

(58) Field of Classification Search
None
See application file for complete search history.

(56) References Cited

U.S. PATENT DOCUMENTS

| 2020/0342059 A1* | 10/2020 | Ziuzin | G06F 40/211 |
| 2021/0165883 A1* | 6/2021 | Zhang | G06F 9/4411 |

* cited by examiner

*Primary Examiner* — Brandon Hoffman

(74) *Attorney, Agent, or Firm* — FIG. 1 Patents

(57) ABSTRACT

An electronic device (e.g., smartphone) identifies digital content and classifies the digital content as confidential digital content via one or more machine learning models. The electronic device automatically stores the confidential digital content in a secure digital storage. The secure digital storage maintains the confidential digital content separately from digital content that is not classified as confidential digital content. Access to the secure digital storage is controlled by the electronic device such that the confidential digital content within the secure digital storage is not exposed outside of the secure digital storage.

20 Claims, 6 Drawing Sheets

Electronic Device 102

Display 104

Microphone 108

Speaker 110

Processing System 112

Operating System 114

Application 116

Communication System 118

Storage Device 120

Secure Digital Storage 122

Unsecured Digital Storage 124

Secure Digital Content System 126

Image Capture System 128

Secure Folder

106

Figure 2:
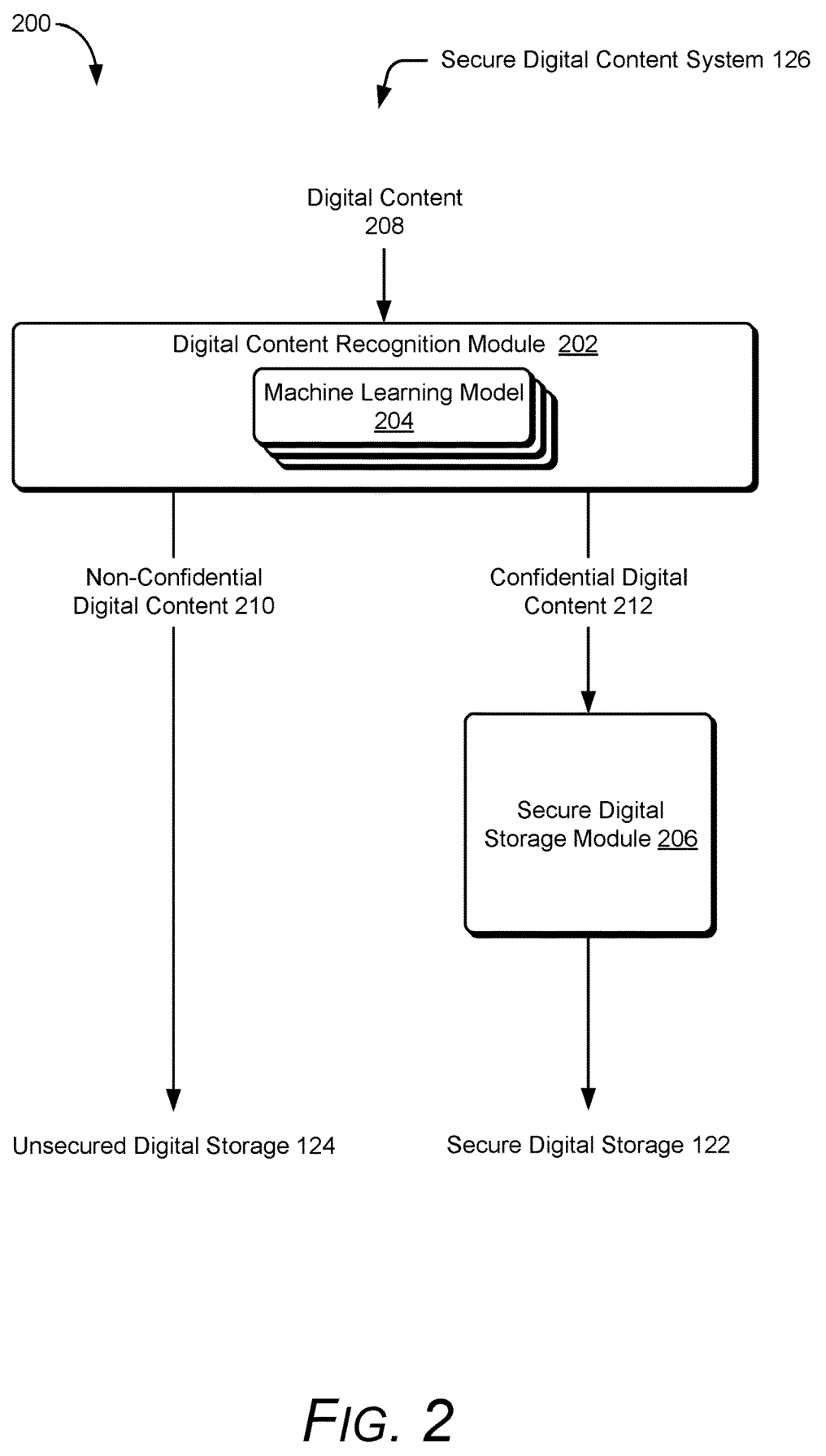

200

Secure Digital Content System 126

Digital Content
208

Digital Content Recognition Module  202

Machine Learning Model
204

Non-Confidential
Digital Content 210

Confidential Digital
Content 212

Secure Digital
Storage Module 206

Unsecured Digital Storage 124

Secure Digital Storage 122

Figure 3:
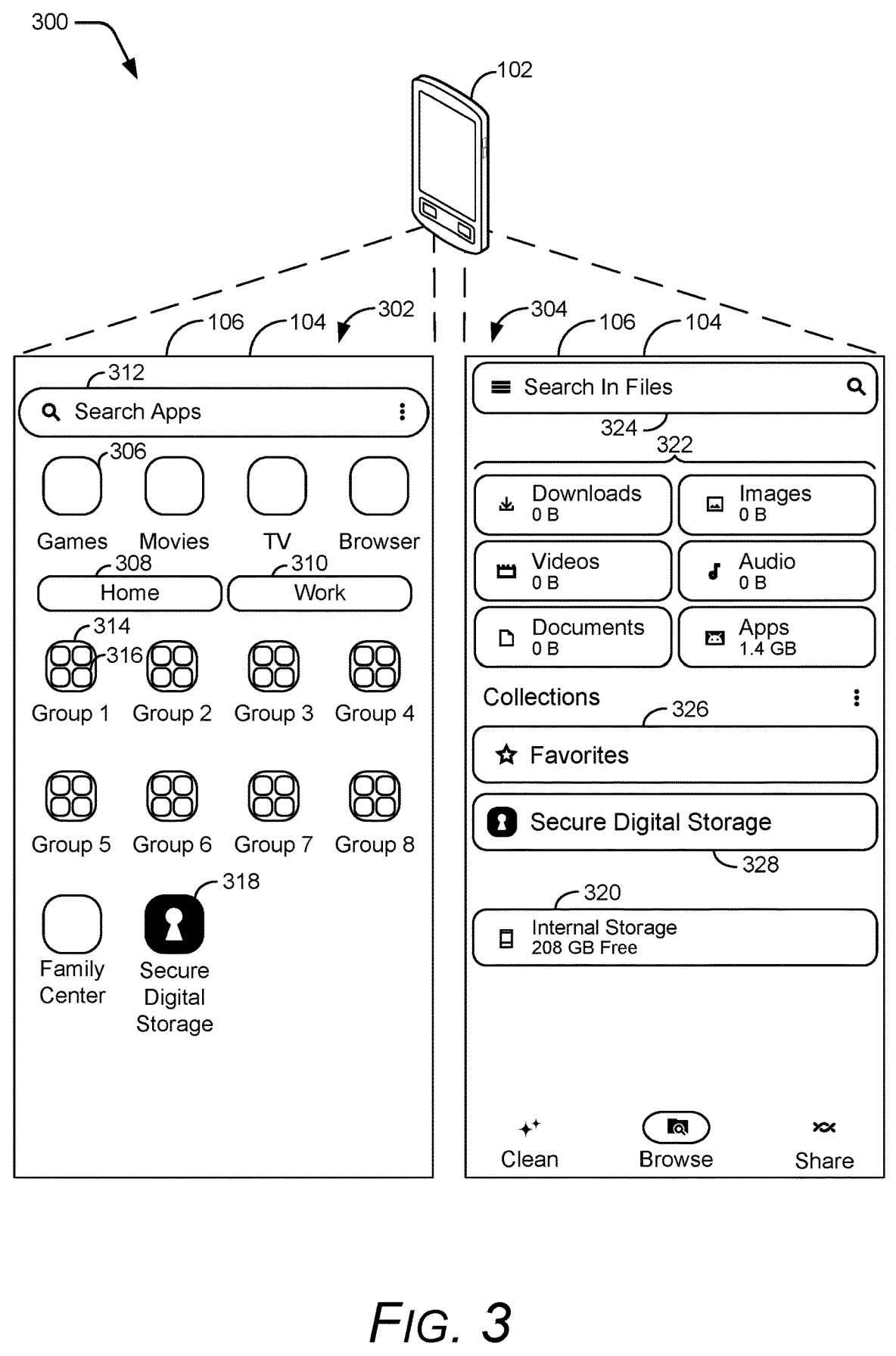

🔍 Search Apps ⋮

306

Games    Movies    TV    Browser 308     310

Home      Work 314
316

Group 1   Group 2   Group 3   Group 4

Group 5   Group 6   Group 7   Group 8

318

Family Center    Secure Digital Storage

≡ Search In Files   🔍

324   322

⤓ Downloads
0 B

🖼 Images
0 B

📅 Videos
0 B

♪ Audio
0 B

🗋 Documents
0 B

🖳 Apps
1.4 GB

Collections   ⋮
326

⭐ Favorites

🔒 Secure Digital Storage

328

320

🖷 Internal Storage
208 GB Free

✦ Clean     🔍 Browse     ✕ Share

AUTOMATIC SECURE STORAGE OF CONFIDENTIAL DIGITAL CONTENT

BACKGROUND

As technology advances, our use of electronic devices to store and communicate data has expanded. Electronic devices have become smaller and more mobile, and devices such as smartphones often include cameras, microphones, and other features capable of acquiring data. Further, such electronic devices are often connected to other devices via networks and can share data with the other devices. However, the ability to acquire, store, and share data via such devices has led to problems such as increased occurrences of unintended exposure of data. One solution to this problem is to control access to a user interface of an electronic device via a passcode. Once the passcode is set and the electronic device is locked with the passcode, the user interface is inaccessible until the passcode is input. However, this also has problems because situations arise in which a user forgets to lock the device, forgets to set a passcode, or sets a passcode that is easily guessed. Further, such approaches may provide inadequate protection of data on the device from attacks occurring over a network or through malware. Thus, users can become frustrated when data breaches occur, leading to user frustration with their devices.

BRIEF DESCRIPTION OF THE DRAWINGS

Embodiments of automatic secure storage of confidential digital content are described with reference to the following drawings. The same numbers are used throughout the drawings to reference like features and components:

FIG. 2 illustrates an example implementation of the secure digital content system;

FIGS. 3 and 4 illustrate examples of using the techniques discussed herein;

DETAILED DESCRIPTION

Figure 1:
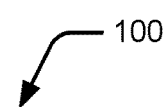
FIG. 1 illustrates an example system implementing the techniques discussed herein.

Automatic secure storage of confidential digital content is discussed herein. Generally, an electronic device (e.g., a smartphone) acquires and stores digital content. The digital content can include various types of data such as image data, audio data, and/or textual data. Digital content can be acquired by the electronic device in a variety of ways. Some examples of acquiring digital content include receiving digital content through a connection of the device to a network (e.g., a cellular network), through wired or wireless communications with other devices (e.g., via Bluetooth®), and/or through direct capture of digital content using one or more image sensors or audio sensors of the electronic device. In some instances, digital content includes applications that are executable by the electronic device, such as banking or finance applications, messaging applications, and so forth.

In an implementation, the electronic device identifies digital content and determines whether the digital content includes confidential information. To do so, the electronic device processes the digital content via one or more machine learning models trained to identify data within the digital content that may be considered sensitive or personal. Digital content that has been processed and classified as confidential digital content by the one or more machine learning models is automatically stored within a secure digital storage of the electronic device. The secure digital storage is maintained separately from other storage of the electronic device, and the confidential digital content is not exposed by the electronic device outside of the secure digital storage. Access to the secure digital storage is controlled by the electronic device using a digital key in some instances.

The electronic device supports identification of the digital content in a variety of ways. As one example, the electronic device can identify digital content by performing a scan of unsecured digital storage of the electronic device. Such scans may identify a plurality of instances of digital content, with each instance of digital content processed by the one or more machine learning models for classification. Digital content that is classified as confidential digital content is automatically moved from the unsecured digital storage to the secure digital storage.

As another example, the electronic device can identify digital content from one or more applications stored on the electronic device, such as electronic mail (email) applications, messaging applications, and so forth. Such identification may be performed as part of a scan in some instances, as described above. However, such identification may additionally or alternatively be performed in real-time, e.g., responsive to receiving digital content via an application. For instance, a digital text message received via a text messaging application of the electronic device can be classified accordingly by the one or more machine learning models upon receipt.

As yet another example, the electronic device can identify digital content acquired by one or more sensors of the electronic device such as a camera and/or microphone. The one or more machine learning models may classify the digital content acquired in this way in real-time, e.g., as the digital content is acquired by the one or more sensors.

In at least one implementation, during conditions in which digital content is identified, the one or more machine learning models are trained on the identified digital content. The training of the one or more machine learning models using the identified digital content can result in increased accuracy of future classification of digital content by the one or more machine learning models. For example, by training the one or more machine learning models on digital content that includes data describing personal identifiers such as a name or image of a user of the electronic device, the one or more machine learning models may more readily classify digital content that includes such identifiers as confidential digital content.

Additionally or alternatively, in some instances, the one or more machine learning models are trained according to which confidential digital content is removed from the secure digital storage. For example, following automatic storage of digital content classified as confidential digital content to the secure digital storage, the user of the electronic device may decide that the confidential digital content can be removed from the secure digital storage (e.g., the data included by the confidential digital content is considered acceptable by the user for storage within unsecured digital storage). Upon removing the confidential digital content from the secure digital storage, the one or more machine learning models are updated accordingly such that similar digital content that is identified at a later time is less likely to be classified as confidential digital content by the one or more machine learning models. In this way, the one or more machine learning models adapt over time to classify digital content more accurately based on types of digital content that the user considers to be confidential.

The techniques discussed herein improve the operation of an electronic device by automatically storing digital content that includes sensitive or personal information to the secure digital storage. The techniques allow the electronic device to control access to the secure digital storage such that the confidential digital content is not inadvertently exposed outside of the secure digital storage. The user is alleviated of the burden of manually identifying such content or manually moving such content to secure storage.

Furthermore, in contrast to a solution that controls access to digital content by locking a user interface of an electronic device, the techniques discussed herein automatically store confidential digital content to the secure digital storage without human intervention. The secure digital storage is maintained separately from unsecure digital storage. Thus, even during conditions in which the unsecure digital storage is exposed (e.g., the user interface of the electronic device is not locked), the electronic device controls access to the secure digital storage and prevents exposure of the confidential digital content outside of the secure digital storage.

FIG. 1 illustrates an example system 100 implementing the techniques discussed herein. The system 100 includes an electronic device 102 that can be, or include, many different types of computing or electronic devices. For example, the electronic device 102 can be a smartphone or other wireless phone, a camera (e.g., compact or single-lens reflex), a wearable device (e.g., a smartwatch, an augmented reality headset or device, a virtual reality headset or device), a personal media player, a personal navigating device (e.g., global positioning system), an entertainment device (e.g., a gaming console, a portable gaming device, a streaming media player, a digital video recorder, a music or other audio playback device), a video camera, an Internet of Things (IoT) device, an automotive computer, and so forth. The electronic device 102 is oftentimes a device having a relatively small display screen making it attractive for mobility. Although typically a smaller device, the electronic device 102 can be larger (e.g., a tablet or phablet computer, a notebook computer (e.g., netbook or ultrabook), a laptop computer, and so forth.

The electronic device 102 includes a display 104. The display 104 can be configured as any suitable type of display, such as an OLED display, active matrix OLED display, LCD, in-plane shifting LCD, projector, and so forth. The display 104 can be touch enabled or not touch enabled. A touch-enabled device refers to a device that receives touch inputs via the display 104 (e.g., a touchscreen). A touch-enabled device may also receive inputs via other input mechanisms, such as a trackpad, mouse, physical keyboard, and so forth. A non-touch-enabled device refers to a device that does not receive touch inputs via the display (e.g., a touchscreen). Accordingly, a non-touch-enabled receives inputs via other input mechanisms, such as trackpad, mouse, physical keyboard, and so forth.

The electronic device 102 is implemented to display a user interface 106 via display 104. The user interface 106 supports navigation of various digital content, secure digital storage, and unsecured digital storage of the electronic device 102, as described further below. In implementations in which the electronic device 102 is a touch-enabled device (e.g., display 104 is a touchscreen), the user interface 106 displayed by the display 104 may be navigated according to touch input applied to the display 104.

The electronic device 102 also includes a microphone 108 and a speaker 110. The microphone 108 can be configured as any suitable type of microphone incorporating a transducer that converts sound into an electrical signal, such as a dynamic microphone, a condenser microphone, a piezoelectric microphone, and so forth. The speaker 110 can be configured as any suitable type of speaker incorporating a transducer that converts an electrical signal into sound, such as a dynamic loudspeaker using a diaphragm, a piezoelectric speaker, non-diaphragm based speakers, and so forth.

Although illustrated as part of the electronic device 102, it should be noted that one or more of the microphone 108 and the speaker 110 can be implemented separately from the electronic device 102. In such situations, the electronic device 102 can communicate with the microphone 108 or the speaker 110 via any of a variety of wired (e.g., Universal Serial Bus (USB), USB-C, IEEE 1394, or wireless (e.g., Wi-Fi, Bluetooth, infrared (IR)) connections. For example, the microphone 108 may be separate from the electronic device 102 and voice inputs received by the microphone 108 are communicated to the electronic device 102 via an IR or radio frequency wireless connection.

The microphone 108 is employed by the electronic device 102 to acquire digital content including audio data, in some implementations. Such audio data may include, for example, recordings of conversations or presentations, music, dictation, and the like.

The electronic device 102 also includes a processing system 112 that includes one or more processors, each of which can include one or more cores. The processing system 112 is coupled with, and may implement functionalities of, any other components or modules of the electronic device 102 that are described herein. In one or more embodiments, the processing system 112 includes a single processor having a single core. Alternatively, the processing system 112 includes a single processor having multiple cores or multiple processors (each having one or more cores).

The electronic device 102 also includes an operating system 114. The operating system 114 manages hardware, software, and firmware resources in the electronic device 102. The operating system 114 manages one or more applications 116 running on the electronic device 102 and operates as an interface between applications 116 and hardware components of the electronic device 102.

The electronic device 102 also includes a communication system 118. The communication system 118 manages communication with devices external to the electronic device 102. For example, the communication system 118 facilitates acquisition of digital content by the electronic device 102 from external devices such as mobile phones, laptops, desktop computers, tablets, and so forth. The electronic device 102 can communicate with the external devices via the communication system 118 using any of a variety of wired or wireless connections, such as USB, USB-C, WiFi™, WiFi™ IP (Internet Protocol), USB IP, DisplayPort, High-Definition Multimedia Interface (HDMI), and so forth.

The electronic device 102 also includes a storage device 120 including a secure digital storage 122 and an unsecured digital storage 124. The storage device 120 can be implemented using any of a variety of storage technologies, such as magnetic disk, optical disc, Flash, or other solid state memory, and so forth. The storage device 120 can store various program instructions and data for any one or more of the operating system 114, application 116, and secure digital content system 126.

In some implementations, the secure digital storage 122 and the unsecured digital storage 124 are separate partitions (e.g., allocations) of the storage device 120. In some instances, the secure digital storage 122 may be encrypted, and confidential digital content stored within the secure digital storage 122 may be encrypted while the confidential digital content is maintained within the secure digital storage 122. Further, in some instances, removing encrypted confidential digital content from the secure digital storage 122 (e.g., moving the content from the secure digital storage 122 to the unsecured digital storage 124) may include removing the encryption of the content.

Although the secure digital storage 122 is depicted as included by the storage device 120, in at least one implementation the secure digital storage 122 is separate (e.g., external) from the electronic device 102 and is accessible over a secure network, e.g., as a cloud service. For example, according to the techniques described herein, digital content of the electronic device that is classified as confidential digital content is automatically stored to the secure digital storage 122, and the storage of the confidential digital content to the secure digital storage 122 may include transmitting the confidential digital content to the secure digital storage 122 securely over the network.

The electronic device 102 controls access to the unsecured digital storage 124 and the secure digital storage 122 separately. For example, during operation of the electronic device 102, the electronic device 102 can control access to the unsecured digital storage 124 by locking or unlocking the user interface 106. The unsecured digital storage 124 includes data normally accessible to the user during operation of the electronic device 102, such as non-confidential digital images, non-confidential text messages, non-confidential recordings, data associated with non-confidential applications, and so forth. Locking the user interface 106 includes, for instance, displaying an overlay of the user interface 106 that persists until a user-defined passcode is input. While the user interface 106 is unlocked, the electronic device 102 permits navigation through the digital content included by the unsecured digital storage 124, as well as operations performed using the digital content such as execution of applications, display or playback of the digital content, and so forth.

Access to the secure digital storage 122 is controlled based on input of additional credentials or verification, in at least one implementation (e.g., additional to the passcode described above used to unlock the user interface 106). In at least some implementations, access to the secure digital storage 122 is controlled via a secure digital content system 126 of the electronic device 102.

The secure digital content system 126 can be implemented in a variety of different manners. For example, the secure digital content system 126 can be implemented as multiple instructions stored on computer-readable storage media and that can be executed by the processing system 112. Additionally or alternatively, the secure digital content system 126 can be implemented at least in part in hardware (e.g., as an application-specific integrated circuit (ASIC), a field-programmable gate array (FPGA), an application-specific standard product (ASSP), a system-on-a-chip (SoC), a complex programmable logic device (CPLD), and so forth).

In an example, access to the secure digital storage 122 may be controlled based on input of a digital key to electronic device 102 via the user interface 106, where the digital key is separate from the passcode described above used to unlock the user interface 106. The digital key may be a user-defined additional passcode (e.g., specified via user input) that is input when requesting access to navigate the contents of the secure digital storage 122 via the user interface 106. In some instances, the digital key is a user-defined gesture (e.g., a particular swipe, a particular touch and hold action, a particular multi-finger swipe or movement, or a combination thereof), biometric input (e.g., fingerprint, retina scan, and so forth), or other type of input used to verify authorized access to the secure digital storage 122. The secure digital content system 126 determines whether the digital key has been input and provides access to the secure digital storage 122 accordingly.

In at least one implementation, access to the secure digital storage 122 is controlled based on confidential digital content already stored within the secure digital storage 122. For example, the secure digital storage 122 may include confidential digital content including personal identifiers such as one or more identification numbers associated with an individual (e.g., a government-issued license number of a user of the electronic device 102), a signature of the individual, and so forth. During conditions in which access to the secure digital storage 122 is requested by a user, the electronic device 102 may employ the secure digital content system 126 to provide a prompt via the user interface 106.

Responsive to inputting one or more of the personal identifiers to the prompt, the secure digital content system 126 determines whether the identifiers that were input match the personal identifiers from the confidential digital content within the secure digital storage 122 (e.g., the identifiers are compared). In some examples, the input may be in the form of textual input to the prompt (e.g., inputting an identification number via a virtual or physical keyboard). In other examples, the input may be in the form of an image input to the prompt (e.g., acquiring an image of a government-issued identification card associated with the individual). If a match is confirmed, the secure digital content system 126 may provide access to the secure digital storage 122 via the user interface 106. However, if a match is not confirmed, the secure digital content system 126 does not provide access to the secure digital storage 122. In this way, if a user inadvertently loses access to the secure digital storage 122 (e.g., the user forgets or loses the digital key), the secure digital content system 126 is able to verify authorization to access the secure digital storage 122 without the digital key.

The electronic device 102 further includes an image capture system 128. The image capture system 128 includes, in at least some implementations, a camera having a lens and one or more image sensors. In some instances, the image capture system 128 is integrated with the electronic device 102, e.g., in examples in which the electronic device 102 is configured as a mobile phone. In other instances, the image capture system 128 is in electronic communication with the electronic device 102 (e.g., via a wired or wireless connection) and is external to the electronic device 102.

The image capture system 128 is employed by the electronic device 102 to acquire digital content including image data, such as digital images and/or digital video. According to the techniques described herein, image data acquired via the image capture system 128 is identified as digital content and is classified by the secure digital content system 126. Classifying the digital content acquired via the image capture system 128 includes, for example, classifying the digital content as confidential digital content responsive to determining that the digital content includes confidential information. Acquired digital content that is classified as confidential digital content is automatically stored to the secure digital storage 122. Image data that includes confidential information, for example, may be image data depicting identification numbers associated with one or more individuals, image data acquired from a confidential location (e.g., a private presentation), image data depicting prototypes or mockups, compromising image data (e.g., image data depicting one or more individuals in a compromised manner), and so forth.

The electronic device 102 also employs microphone 108 to acquire digital content including audio data, such as dictation, conversation recordings, music recordings, and so forth. The digital content acquired using the microphone 108 is also classified by the secure digital content system 126. Classifying the digital content acquired via the microphone 108 includes, for example, classifying the digital content as confidential digital content responsive to determining that the digital content includes confidential information. The acquired digital content that is classified as confidential digital content is automatically stored to the secure digital storage 122. Audio data that includes confidential information, for example, may be audio data describing personal details (e.g., social security numbers, birthdates, etc.), legal matters, conversations involving law enforcement, academic matters, and so forth.

FIG. 2 illustrates an example implementation 200 of the secure digital content system 126. The secure digital content system 126 includes a digital content recognition module 202 having at least one machine learning model, such as machine learning model 204, and a secure digital storage module 206. The machine learning model 204 is employed by the digital content recognition module 202 to classify digital content as confidential digital content, as described in the examples above and below. Although machine learning model 204 is depicted, it should be appreciated that the digital content recognition module 202 can include additional machine learning models trained to process particular types of digital content. For example, the digital content recognition module 202 in at least some implementations includes a first machine learning model trained to classify digital content including image data (e.g., an image recognition machine learning model, such as a deep neural network), a second machine learning model trained to classify digital content including audio data (e.g., an audio recognition machine learning model, such as a large language model), and a third machine learning model trained to classify digital content including textual data (e.g., a textual recognition machine learning model, such as another large language model). Further, machine learning model 204 may be representative of a single machine learning model capable of processing two or more of the different types of data described above that can be included by digital content.

In the depicted implementation 200, the digital content recognition module 202 receives digital content 208. The digital content 208 can include, for example, image data, audio data, and/or textual data. The digital content recognition module 202 processes the digital content 208 via the machine learning model 204, which classifies the digital content as confidential digital content or non-confidential digital content. To do so, the machine learning model 204 determines whether the digital content 208 includes confidential information, similar to the examples described above. The machine learning model 204 is trained on a data set including a plurality of identifiers associated with confidential information. For example, the machine learning model 204 is trained to detect letters and numbers within image data and determine whether particular sequences of letters and/or numbers within the image data are similar to sequences used in personal documents such as government-issued licenses or other materials. As another example, the machine learning model 204 may additionally or alternatively detect audible words or other sounds within the digital content and determine whether the words or sounds are similar to words or sounds often associated with private information (e.g., employment information, tax records, banking details, and so forth).

The machine learning model 206 includes one or more of a variety of different public or proprietary machine learning systems. A machine learning system refers to a computer representation that can be tuned (e.g., trained) based on inputs to approximate unknown functions. In particular, machine learning systems can include a system that utilizes algorithms to learn from, and make predictions on, known data by analyzing the known data to learn to generate outputs that reflect patterns and attributes of the known data. For instance, a machine learning system can include decision trees, support vector machines, linear regression, logistic regression, Bayesian networks, random forest learning, dimensionality reduction algorithms, boosting algorithms, artificial neural networks, deep learning, and so forth.

The data used for training of the machine learning model 204 may be selected based on various characteristics of the data and the types of content to be detected by the machine learning model 204. The training data may include, for instance, data describing various watermarks or labels, data describing file names, metadata, data describing a device context during acquisition of digital content (e.g., device location, applications in use, sensors in use, etc.), symbols or logos, and/or other data. By training the machine learning model 204 using such training data, the secure digital content system 126 supports identification and classification of a wide variety of content as confidential digital content via the machine learning model 204. For example, the machine learning model 204 may be employed by the secure digital content system 126 to identify confidential digital content by detecting sensitive data such as watermarks, labels, file names, metadata, symbols, logos, and so forth, based on the training of the machine learning model 204 using training data such as the training data described above.

In at least one implementation, the machine learning model 204 is pre-trained using the training data describing various types of sensitive content as described above. Additionally and/or alternatively, the machine learning model 204 is trained responsive to adding confidential digital content to the secure digital storage 122 and/or removing confidential digital content from the secure digital storage 122. For example, in at least one implementation, following classification of digital content as confidential digital content by the machine learning model 204, the machine learning model 204 is re-trained (e.g., updated) based on data included by the digital content (e.g., watermarks, symbols, and/or other sensitive data). As another example, in at least one implementation, following removal of digital content from the secure digital storage 122, the machine learning model 204 is retrained based on the removed digital content. The re-training may include updating the machine learning model 204 to not classify other digital content as confidential digital content when the machine learning model 204 detects that data included by the other digital content is similar to, or the same as, data included by the digital content that was removed from the secure digital storage 122.

If personal information (e.g., private information or confidential information) is not detected within the digital content 208 during the processing of the digital content 208 by the digital content recognition module 202 using the machine learning model 204, the digital content recognition module 202 classifies the digital content 208 via the machine learning model 204 as non-confidential digital content 210. As a result, the non-confidential digital content 210 is stored or maintained within the unsecured digital storage 124 and is available for browsing via the user interface 106 of the electronic device 102 as described above.

However, if personal information is detected within the digital content 208, the digital content recognition module 202 classifies the digital content 208 via the machine learning model 204 as confidential digital content 212. The secure digital storage module 206 receives the confidential digital content 212 and stores the confidential digital content 212 to the secure digital storage 122 automatically (e.g., responsive to the classifying of the confidential digital content 212 and without human intervention).

FIG. 3 illustrates an example 300 showing navigation of different portions of the user interface 106 of the electronic device 102. In particular, a first menu 302 and a second menu 304 of the user interface 106 is shown. In the following discussion, the relative arrangement of icons and other features of the user interface 106 is described. However, it should be appreciated that in at least some implementations the relative arrangement of the features and/or the features themselves may be different.

The first menu 302 depicts various icons, buttons, and other shortcuts used to navigate to digital content included within the unsecured digital storage 124 of the electronic device 102. For example, while displaying the first menu 302, the user interface 106 provides quick access to applications (e.g., games, movies, television, etc.) via a set of icons at an upper portion of the first menu 302, such as icon 306. The first menu 302 further shows a first shortcut button 308 providing quick access to digital content within the unsecured digital storage 124 associated with a "home" category and a second shortcut button 310 providing quick access to digital content within the unsecured digital storage 124 associated with a "work" category. The first menu 302 additionally includes a search bar 312. The electronic device 102 supports searching of the digital content stored within the unsecured digital storage 124 via the search bar 312.

The electronic device 102 supports grouping of digital content, and the groups of digital content are represented by respective icons shown by the first menu 302. For example, first menu 302 shows a first group of digital content represented by a first group icon 314. The first group icon 314 includes a plurality of smaller icons, such as icon 316, and each of the smaller icons represents digital content within the unsecured digital storage 124. Interaction with a given group icon, such as the first group icon 314, navigates the user interface 106 to the grouping of digital content represented by that icon.

The first menu 302 additionally includes a secure digital storage icon 318. Navigation to the secure digital storage 122 can be performed through interaction with the secure digital storage icon 318, e.g., touching the secure digital storage icon 318 in instances in which the display 104 is a touchscreen display, selecting the secure digital storage icon 318 via an input device such as a mouse or trackball, etc. However, as described above, access to the confidential digital content within the secure digital storage 122 is controlled by secure digital content system 126 based on input of additional credentials or verification such as the digital key.

For example, during conditions in which a user interacts with the secure digital storage icon 318 to request access to navigate the user interface 106 to the secure digital storage 122, the secure digital content system 126 controls the user interface 106 to display the prompt for input of the digital key. If the digital key is not input or an incorrect digital key is input, the secure digital content system 126 denies access to the secure digital storage 122. Although in the example shown the secure digital storage icon 318 is visible, in at least one implementation the user interface 106 hides the secure digital storage icon 318 for increased security or displays a different icon (e.g., a false icon) instead of the secure digital storage icon 318 to obscure the access to the secure digital storage 122.

The second menu 304 shows another portion of the user interface 106 that can be used to request access to the secure digital storage 122. The second menu 304 includes various information about the unsecured digital storage 124, such as an overall storage capacity or usage of the unsecured digital storage 124 shown by indicator 320, as well as a usage of the unsecured digital storage 124 attributed to different types of digital content as shown by indicators 322. The second menu 304 further includes another search bar 324 and a shortcut 326 to access favorited digital content within the unsecured digital storage 124. Additionally, the second menu 304 includes a secure digital storage button 328 that can be used to request access to navigate the user interface 106 to the secure digital storage 122. Following interaction with the secure digital storage button 328 (e.g., selecting the secure digital storage button 328), the secure digital content system 126 controls the user interface 106 to display the prompt for the additional credentials or verification to access the secure digital storage 122, similar to the secure digital storage icon 318 described above.

Figure 4:
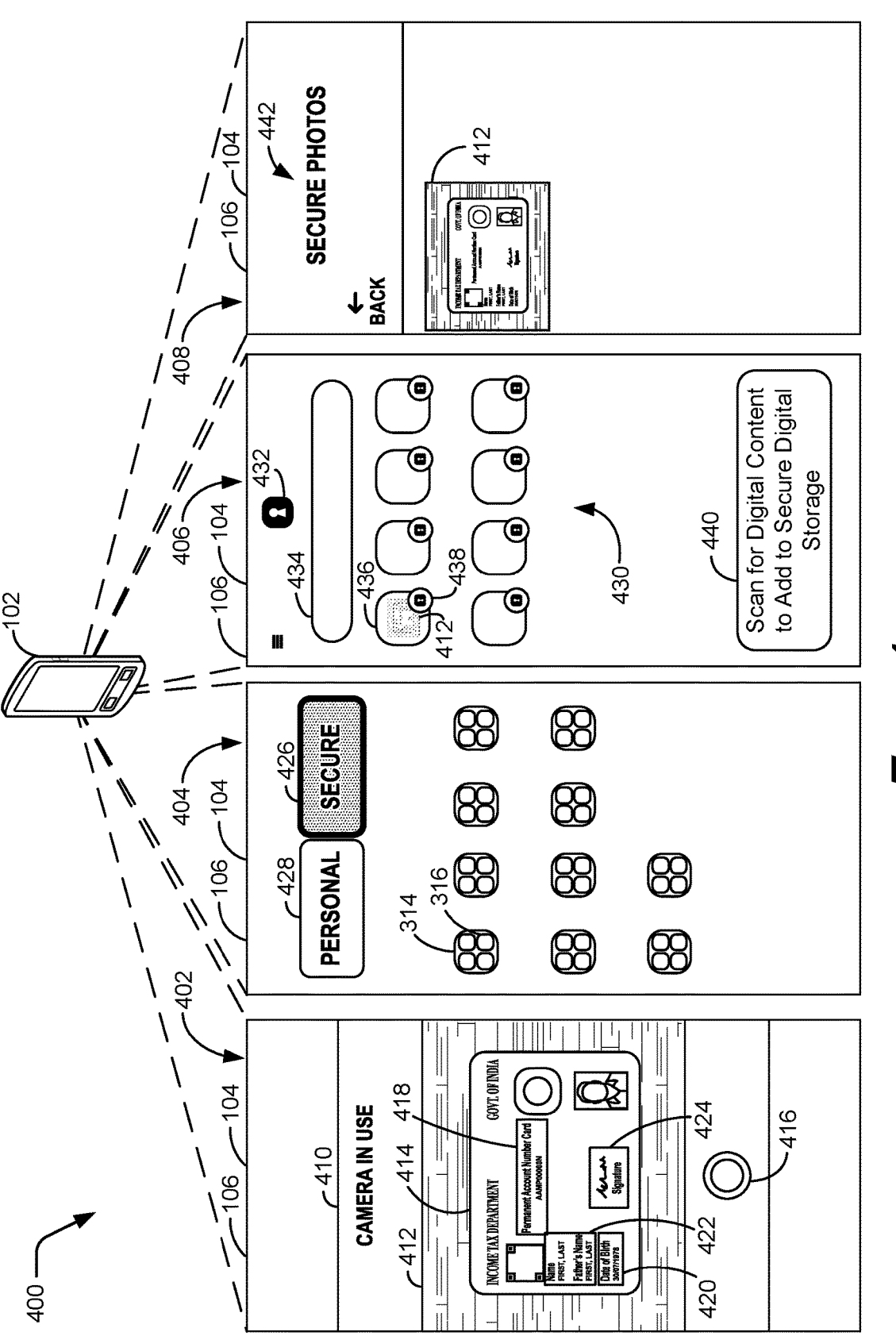

FIG. 4 illustrates another example 400 showing navigation of different portions of the user interface 106 of the electronic device 102. In particular, a first menu 402, a second menu 404, a third menu 406, and a fourth menu 408 are shown. In the following discussion, the relative arrangement of icons and other features of the user interface 106 is described. However, it should be appreciated that in at least some implementations the relative arrangement of the features and/or the features themselves may be different.

The first menu 402 depicts acquisition of digital content including image data via the image capture system 128 of the electronic device 102. In particular, the first menu 402 shows an imaging interface 410 depicting an output of one or more image sensors of the image capture system 128 (e.g., from a camera of the image capture system 128). In the example shown, the image capture system 128 is employed to acquire digital content 412 (e.g., a digital image) depicting an identification card 414 of an individual (e.g., a user of the electronic device 102).

The imaging interface 410 displays the acquisition of the digital content 412 in real-time. That is, as the one or more image sensors are moved around the identification card 414 in physical space, the angle and position of the identification card 414 as viewed through the imaging interface 410 updates accordingly. Responsive to input applied to the capture button 416 (e.g., during conditions in which the user selects the capture button 416 by touching the capture button 416, selecting the capture button 416 via a mouse or trackpad, etc.), the image capture system 128 initiates storing of the digital content 412 to the storage device 120. However, prior to the storage of the digital content 412 to the storage device 120, the secure digital content system 126 processes the digital content 412 to determine whether the digital content 412 includes confidential information.

In at least one implementation, the secure digital content system 126 processes the digital content 412 in real-time, e.g., based on the real-time output of the one or more image sensors of the image capture system 128. For example, the secure digital content system 126 may process each image frame generated by the one or more image sensors (as the image frames are acquired) to determine whether the subject imaged by the one or more image sensors depicts confidential information.

In the example shown, the digital content 412 depicts several identifiers that the one or more machine learning models (e.g., machine learning model 204) of the secure digital content system 126 can identify to confirm whether the digital content 412 includes confidential information. In particular, the digital content 412 includes a first identifier 418 depicting an identification number of an individual, a second identifier 420 depicting a date of birth of the individual, a third identifier 422 depicting a full name of the individual and a full name of a relative of the individual, and a fourth identifier 424 depicting a signature of the individual. Based on these identifiers, the one or more machine learning models determine that the digital content 412 includes confidential information.

Following the determination that the digital content 412 includes confidential information, the digital content 412 is classified by the one or more machine learning models of the secure digital content system 126 as confidential digital content. The navigation of the user interface 106 proceeds from first menu 402 to second menu 404, which includes an indicator 426 that provides a visual notification to the user of the electronic device 102 that the digital content 412 has been stored to the secure digital storage 122. In some examples, the electronic device 102 may output an audio notification indicating that digital content has been stored to the secure digital storage 122. The audio notification may be in addition to (or in lieu of) the visual notification. During conditions in which digital content is instead stored to the unsecured digital storage 124, another indicator 428 provides visual confirmation that the digital content is stored to the unsecured digital storage 124.

The third menu 406 depicts confidential digital content 430 stored within the secure digital storage 122, such as the digital content 412 classified as confidential digital content. The third menu 406 includes secure digital storage menu icon 432 indicating that the user interface 106 has been navigated to the secure digital storage 122. The secure digital storage menu icon 432 further includes a search bar 434. The search bar 434 supports searching of the digital content of the secure digital storage 122. Within the secure digital storage 122, the confidential digital content can be sorted into different groups. Each group is represented by a respective icon, such as group icon 436. Each group icon additionally is depicted with a secured icon 438 indicating that the group includes confidential digital content.

The third menu 406 further includes, at least in one implementation, a scan button 440. During conditions in which a scan of the unsecured digital storage 124 is desired to identify additional digital content that includes confidential information, the user of the electronic device 102 may interact with the scan button 440 (e.g., select the scan button 440) to initialize the scan of the unsecured digital storage 124 as described above. By performing the scan of the unsecured digital storage 124, large amounts of digital content can be identified and classified as a batch operation, which increases an ease of moving digital content that includes confidential information from the unsecured digital storage 124 to the secure digital storage 122.

The fourth menu 408 depicts navigation of the group of confidential digital content represented by the group icon 436. That is, the fourth menu 408 depicts the confidential digital content included within that group, such as the digital content 412. In the example shown, a name of the group is additionally displayed. In this example, the group includes digital photos within the secure digital storage 122, as indicated by confidential digital content group name 442.

Figure 5:
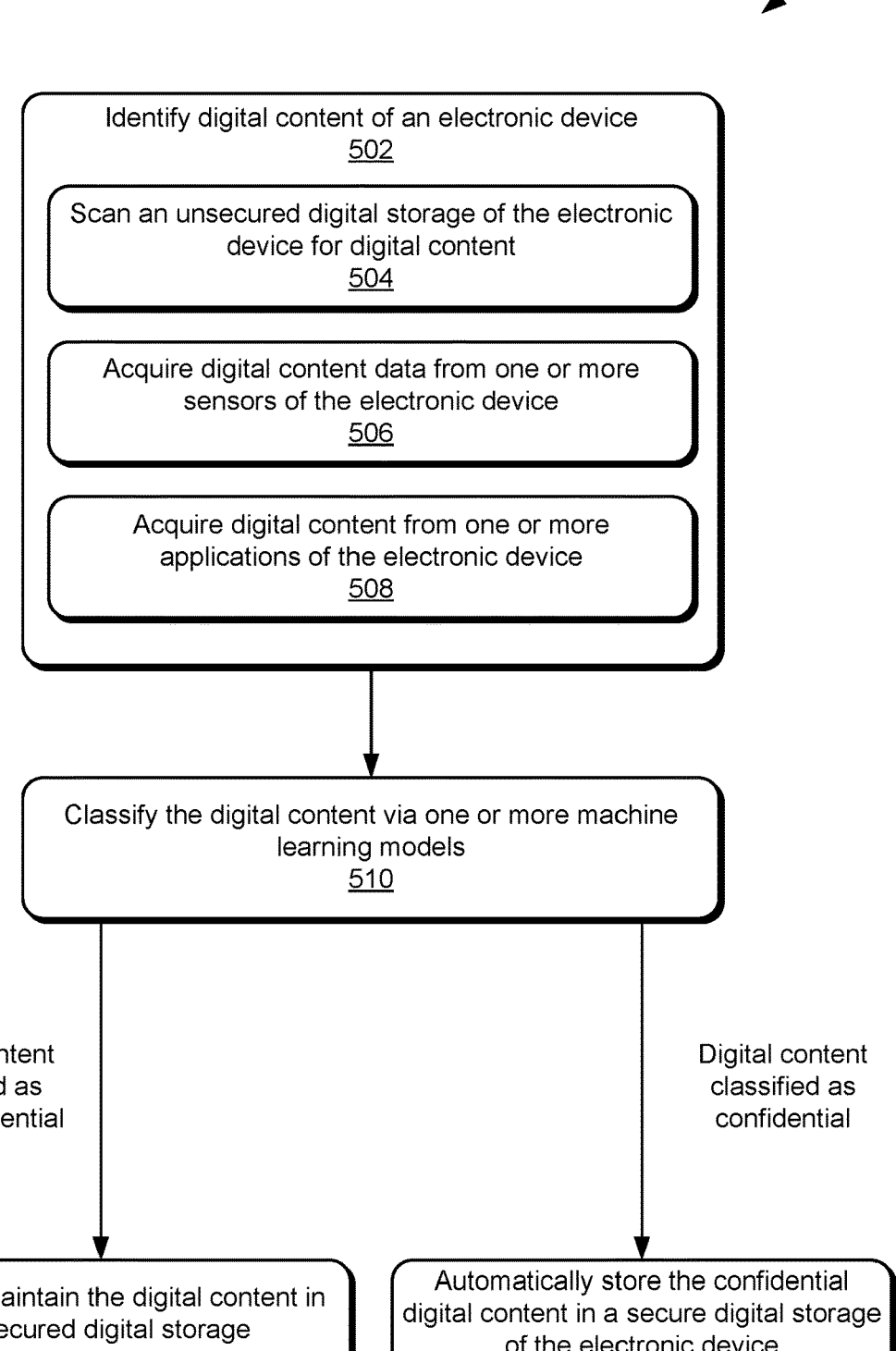
FIG. 5 illustrates an example process for implementing the techniques discussed herein in accordance with one or more embodiments.

FIG. 5 illustrates an example process 500 for implementing the techniques discussed herein in accordance with one or more embodiments. Process 500 is carried out by a secure digital content system, such as the secure digital content system 126 of FIG. 1 or FIG. 2, and can be implemented in software, firmware, hardware, or combinations thereof. Process 500 is shown as a set of acts and is not limited to the order shown for performing the operations of the various acts.

In process 500, a digital content of an electronic device is identified (act 502). The digital content includes, for example, image data, audio data, and/or textual data.

Identifying the digital content may include scanning unsecured digital storage of the electronic device (act 504). Scanning the unsecured digital storage includes, for example, performing search operations across an entire volume (e.g., entire contents) of the unsecured digital storage. The search operations may generate search results indicating the digital content stored within the unsecured digital storage, along with information describing the digital content (e.g., file names for digital content, metadata associated with the digital content, location of the digital content within the unsecured digital storage, and so forth). Such scanning may identify various types of digital content (e.g., digital content including image data, digital content including textual data, and/or digital content including audio data).

Identifying the digital content may additionally and/or alternatively include acquiring the digital content from one or more sensors of the electronic device (act 506). For example, the digital content can be identified during acquisition of image data via an image capture system of electronic device, acquisition of audio data via a microphone of the electronic device, and/or acquisition of textual data via an email application or text messenger application of the electronic device.

Identifying the digital content may additionally and/or alternatively include acquiring the digital content from one or more applications of the electronic device (act 508). For example, the digital content may be acquired from a text messenger application, an email application, a web browsing application, a photo gallery application, a notepad application, and/or another type of application.

The digital content is classified via one or more machine learning models (act 510). Classifying the digital content includes determining whether the digital content is confidential digital content or non-confidential digital content via the one or more machine learning models.

If the digital content is classified as non-confidential digital content, the digital content is stored or maintained in the unsecured digital storage of the electronic device (act 512). Maintaining the digital content in the unsecured digital storage includes, for example, not removing the digital content from the unsecured digital storage or adjusting the storage location of the digital content.

However, if the digital content is classified as confidential digital content, the digital content is automatically stored in a secure digital storage of the electronic device (act 514). The secure digital storage is maintained separately from the unsecured digital storage, similar to the examples described above. Storing the digital content automatically to the secure digital storage includes moving the digital content to the secure digital storage without input or other interaction from a user of the electronic device (e.g., storing the digital content to the secure digital storage is performed by the electronic device without human intervention).

Figure 6:
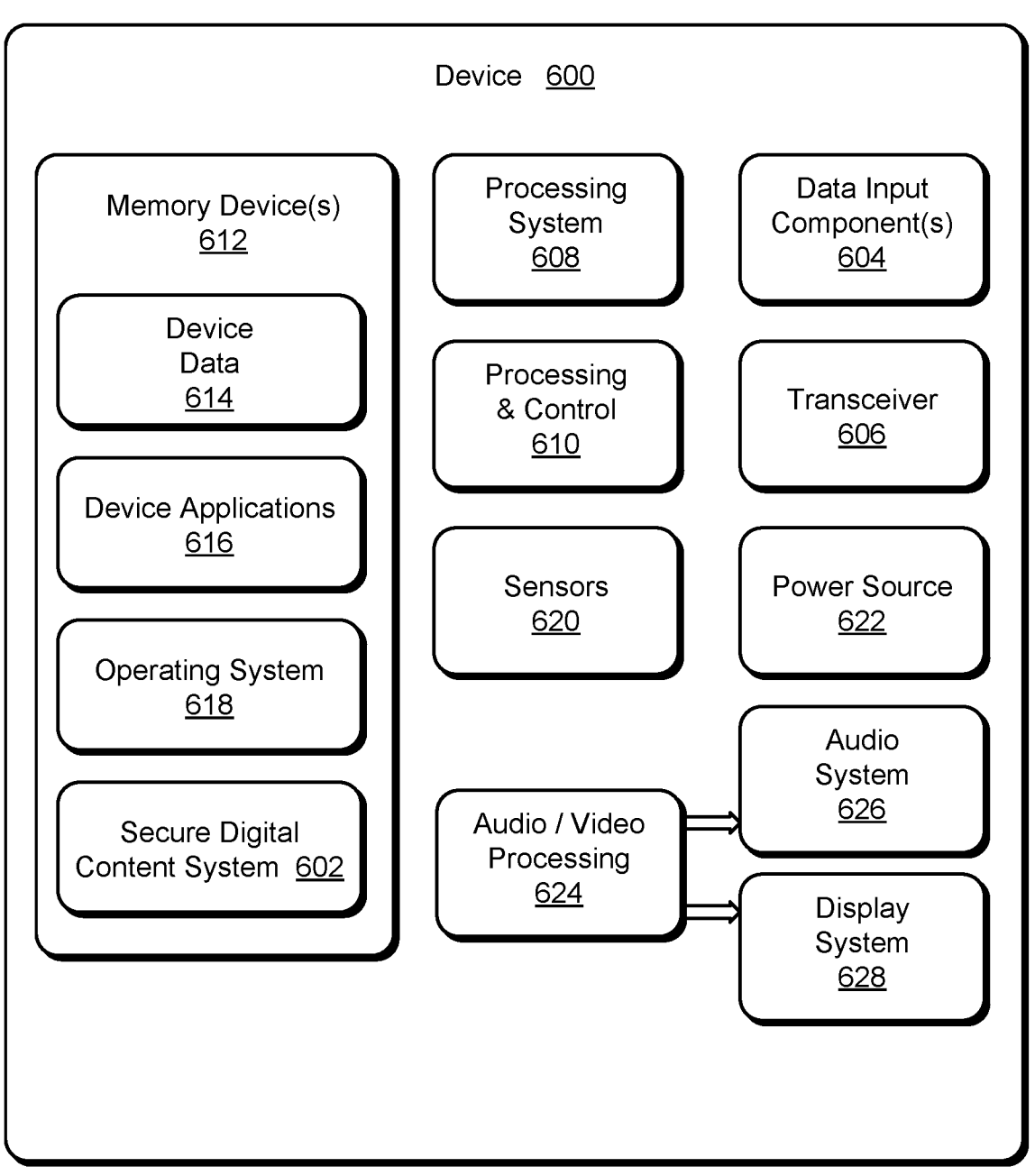
FIG. 6 illustrates various components of an example electronic device that can implement embodiments of the techniques discussed herein.

FIG. 6 illustrates various components of an example electronic device in which embodiments of automatic secure storage of confidential digital content can be implemented. The electronic device 600 can be implemented as any of the devices described with reference to the previous FIGs., such as any type of client device, mobile phone, tablet, computing, communication, entertainment, gaming, media playback, or other type of electronic device. In one or more embodiments the electronic device 600 is the electronic device 102, and a secure digital content system 602 of the electronic device 600 includes the secure digital content system 126 described above.

The electronic device 600 includes one or more data input components 604 via which any type of data, digital content, or inputs can be received such as user-selectable inputs, messages, music, television content, recorded video content, and any other type of text, audio, video, or image data received from any content or data source. The data input components 604 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 604 may also include various other input components such as microphones, touch sensors, touchscreens, keyboards, and so forth.

The device 600 includes communication transceivers 606 that enable one or both of wired and wireless communication of device data with other devices. The device data can include any type of text, audio, video, image data, or combinations thereof. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, wired local area network (LAN) Ethernet transceivers for network data communication, and cellular networks (e.g., third generation networks, fourth generation networks such as LTE networks, or fifth generation networks).

The device 600 includes a processing system 608 of one or more processors (e.g., any of microprocessors, controllers, and the like) or a processor and memory system implemented as a system-on-chip (SoC) that processes computer-executable instructions. The processing system 608 may be implemented at least partially in hardware, which can include components of an integrated circuit or on-chip system, an application-specific integrated circuit (ASIC), a field-programmable gate array (FPGA), a complex programmable logic device (CPLD), and other implementations in silicon or other hardware.

Alternately or in addition, the device can be implemented with any one or combination of software, hardware, firmware, or fixed logic circuitry that is implemented in connection with processing and control circuits, which are generally identified at 610. The device 600 may further include any type of a system bus or other data and command transfer system that couples the various components within the device. A system bus can include any one or combination of different bus structures and architectures, as well as control and data lines.

The electronic device 600 also includes computer-readable storage memory devices 612 that enable data storage, such as data storage devices that can be accessed by the electronic device 600, and that provide persistent storage of data and executable instructions (e.g., software applications, programs, functions, and the like). Examples of the computer-readable storage memory devices 612 include volatile memory and non-volatile memory, fixed and removable media devices, and any suitable memory device or electronic data storage that maintains data for electronic device access. The computer-readable storage memory can include various implementations of random access memory (RAM), read-only memory (ROM), flash memory, and other types of storage media in various memory device configurations. The electronic device 600 may also include a mass storage media device.

The computer-readable storage memory device 612 provides data storage mechanisms to store device data 614, other types of information or data, and various device applications 616 (e.g., software applications). For example, an operating system 618 can be maintained as software instructions within a memory device and executed by the processing system 608 coupled with the memory devices 612. Device data 614 includes various types of digital content, in some examples. The device applications 616 may also include a device manager, such as any form of a control application, software application, signal-processing and control module, code that is native to a particular device, a hardware abstraction layer for a particular device, and so on.

The device 600 can also include one or more device sensors 620, such as any one or more of an ambient light sensor, a proximity sensor, a touch sensor, an infrared (IR) sensor, accelerometer, gyroscope, thermal sensor, audio sensor (e.g., microphone), and the like. The device 600 can also include one or more power sources 622, such as when the device 600 is implemented as a mobile device. The power sources 622 may include a charging or power system, and can be implemented as a flexible strip battery, a rechargeable battery, a charged super-capacitor, or any other type of active or passive power source.

The device 600 additionally includes an audio or video processing system 624 that generates one or both of audio data for an audio system 626 and display data for a display system 628. In accordance with some embodiments, the audio/video processing system 624 is configured to receive call audio data from the transceiver 606 and communicate the call audio data to the audio system 626 for playback at the device 600. The audio system or the display system may include any devices that process, display, or otherwise render audio, video, display, or image data. Display data and audio signals can be communicated to an audio component or to a display component, respectively, via an RF (radio frequency) link, S-video link, HDMI (high-definition multimedia interface), composite video link, component video link, DVI (digital video interface), analog audio connection, or other similar communication link. In implementations, the audio system or the display system are integrated components of the example device. Alternatively, the audio system or the display system are external, peripheral components to the example device.

Although embodiments of techniques for automatic secure storage of confidential digital content have been described in language specific to features or methods, the subject of the appended claims is not necessarily limited to the specific features or methods described. Rather, the specific features and methods are disclosed as example implementations of techniques for implementing automatic secure storage of confidential digital content. Further, various different embodiments are described, and it is to be appreciated that each described embodiment can be implemented independently or in connection with one or more other described embodiments.

In some aspects, the techniques described herein relate to an electronic device including: at least one memory; and at least one processor coupled with the at least one memory and configured to cause the electronic device to: identify a digital content of the electronic device; classify, using one or more machine learning models, the digital content as confidential digital content; and automatically store the confidential digital content in a secure digital storage of the electronic device.

In some aspects, the techniques described herein relate to an electronic device, wherein the at least one processor is further configured to cause the electronic device to: update the one or more machine learning models based on the confidential digital content.

In some aspects, the techniques described herein relate to an electronic device, wherein the at least one processor is further configured to cause the electronic device to: output an audio notification or a visual notification responsive to automatically storing the confidential digital content in the secure digital storage.

In some aspects, the techniques described herein relate to an electronic device, wherein identifying the digital content includes scanning an unsecured digital storage of the electronic device for the digital content.

In some aspects, the techniques described herein relate to an electronic device, wherein the unsecured digital storage includes digital image content, digital textual content, or digital audio content.

In some aspects, the techniques described herein relate to an electronic device, wherein the at least one processor is further configured to cause the electronic device to: update the one or more machine learning models based on removal of the confidential digital content from the secure digital storage.

In some aspects, the techniques described herein relate to an electronic device, wherein the at least one processor is further configured to cause the electronic device to: identify the digital content from a text messenger application of the electronic device.

In some aspects, the techniques described herein relate to an electronic device, wherein the at least one processor is further configured to cause the electronic device to: identify the digital content from an email application of the electronic device.

In some aspects, the techniques described herein relate to an electronic device, wherein the at least one processor is further configured to cause the electronic device to: receive input specifying a digital key for accessing the secure digital storage; and control access to the secure digital storage based on detection of input including the digital key.

In some aspects, the techniques described herein relate to an electronic device, wherein the one or more machine learning models includes an image recognition machine learning model trained to classify the digital content as the confidential digital content based on image data included in the digital content, a text recognition machine learning model trained to classify the digital content as the confidential digital content based on textual data included in the digital content, and an audio recognition machine learning model trained to classify the digital content as the confidential digital content based on audio data included in the digital content.

In some aspects, the techniques described herein relate to an electronic device, wherein classifying the digital content as the confidential digital content includes comparing the digital content to another confidential digital content within the secure digital storage.

In some aspects, the techniques described herein relate to an electronic device, wherein the at least one processor is further configured to cause the electronic device to: control access to the secure digital storage based on comparing the digital content to another confidential digital content within the secure digital storage.

In some aspects, the techniques described herein relate to an electronic device, wherein the at least one processor is further configured to cause the electronic device to: acquire image data from an image capture system of the electronic device, wherein the digital content includes one or more image frames of the image data.

In some aspects, the techniques described herein relate to a method, implemented in an electronic device, the method including: identifying a digital content of the electronic device; classifying, using one or more machine learning models, the digital content as confidential digital content; and automatically storing the confidential digital content in a secure digital storage of the electronic device.

In some aspects, the techniques described herein relate to a method, wherein identifying the digital content includes scanning an unsecured digital storage of the electronic device for the digital content, where the unsecured digital storage includes digital image content, digital textual content, or digital audio content.

In some aspects, the techniques described herein relate to a method, further including: updating the one or more machine learning models based on removal of the confidential digital content from the secure digital storage.

In some aspects, the techniques described herein relate to a method, wherein the one or more machine learning models includes an image recognition machine learning model trained to classify the digital content as the confidential digital content based on image data included in the digital content, a text recognition machine learning model trained to classify the digital content as the confidential digital content based on textual data included in the digital content, and an audio recognition machine learning model trained to classify the digital content as the confidential digital content based on audio data included in the digital content; and further including: updating the image recognition machine learning model based on the image data; updating the text recognition machine learning model based on the textual data; or updating the audio recognition machine learning model based on the audio data.

In some aspects, the techniques described herein relate to a method, including: acquiring, by an electronic device, digital content including image data, textual data, or audio data; determining, by one or more machine learning models of the electronic device, whether the image data, the textual data, or the audio data includes confidential information; and responsive to determining that the image data, the textual data, or the audio data includes confidential information, automatically storing the digital content to a secure digital storage.

In some aspects, the techniques described herein relate to a method, further including receiving input via a user interface of the electronic device to cause the determining of whether the image data, the textual data, or the audio data includes confidential information to occur automatically responsive to acquiring the digital content.

In some aspects, the techniques described herein relate to a method, wherein the electronic device is a mobile phone, tablet, or laptop computer, and the secure digital storage is an allocated memory of the electronic device or a cloud storage, with access to the secure digital storage controlled through a user interface of the electronic device based on input of a dedicated digital key to the user interface.

What is claimed is:

1. An electronic device comprising:
at least one memory; and
at least one processor coupled with the at least one memory and configured to cause the electronic device to:
acquire digital content;
classify, using one or more machine learning models, the digital content as confidential digital content as the digital content is acquired;
automatically store the confidential digital content in a secure digital storage of the electronic device; and
update the one or more machine learning models based on one or more personal identifiers of a user described by the confidential digital content.

2. The electronic device of claim 1, wherein the at least one processor is further configured to cause the electronic device to: output an audio notification or a visual notification responsive to automatically storing the confidential digital content in the secure digital storage.

3. The electronic device of claim 1, wherein the digital content includes digital image content or digital audio content.

4. The electronic device of claim 1, wherein the at least one processor is further configured to cause the electronic device to: update the one or more machine learning models based on removal of the confidential digital content from the secure digital storage.

5. The electronic device of claim 1, wherein the at least one processor is further configured to cause the electronic device to:
receive input specifying a digital key for accessing the secure digital storage; and
control access to the secure digital storage based on detection of input including the digital key.

6. The electronic device of claim 1, wherein the one or more machine learning models includes an image recognition machine learning model trained to classify the digital content as the confidential digital content based on image data included in the digital content and an audio recognition machine learning model trained to classify the digital content as the confidential digital content based on audio data included in the digital content.

7. The electronic device of claim 1, wherein classifying the digital content as the confidential digital content includes comparing the digital content to another confidential digital content within the secure digital storage.

8. The electronic device of claim 1, wherein the at least one processor is further configured to cause the electronic device to:
control access to the secure digital storage based on comparing the digital content to another confidential digital content within the secure digital storage.

9. The electronic device of claim 1, further comprising an image sensor, and the digital content includes one or more image frames of image data generated using the image sensor.

10. A method, implemented in an electronic device, the method comprising:
acquiring digital content;
classifying, using one or more machine learning models, the digital content as confidential digital content as the digital content is acquired;
automatically storing the confidential digital content in a secure digital storage of the electronic device; and
updating the one or more machine learning models based on user removal of the confidential digital content from the secure digital storage.

11. The method of claim 10, wherein the digital content includes digital image content or digital audio content.

12. The method of claim 10, wherein the one or more machine learning models includes an image recognition machine learning model trained to classify the digital content as the confidential digital content based on image data included in the digital content and an audio recognition machine learning model trained to classify the digital content as the confidential digital content based on audio data included in the digital content; and
further comprising:
updating the image recognition machine learning model based on the image data; or
updating the audio recognition machine learning model based on the audio data.

13. The method of claim 10, further comprising outputting an audio notification or a visual notification responsive to automatically storing the confidential digital content in the secure digital storage.

14. The method of claim 10, wherein classifying the digital content as the confidential digital content includes comparing the digital content to another confidential digital content within the secure digital storage.

15. The method of claim 10, wherein the electronic device is a mobile phone, tablet, or laptop computer, and the secure digital storage is an allocated memory of the electronic device or a cloud storage, with access to the secure digital storage controlled through a user interface of the electronic device based on input of a dedicated digital key to the user interface.

16. A method, comprising:
acquiring, by an electronic device, digital content including image data or audio data;
determining, by one or more machine learning models of the electronic device, whether the image data or the audio data includes confidential information as the digital content is acquired;
responsive to determining that the image data or the audio data includes confidential information, automatically storing, by the electronic device, the digital content to a secure digital storage; and
updating, by the electronic device, the one or more machine learning models based on one or more personal identifiers of a user described by the digital content.

17. The method of claim 16, wherein the electronic device is a mobile phone, tablet, or laptop computer, and the secure digital storage is an allocated memory of the electronic device or a cloud storage, with access to the secure digital storage controlled through a user interface of the electronic device based on input of a dedicated digital key to the user interface.

18. The method of claim 16, further comprising outputting, by the electronic device, an audio notification or a visual notification responsive to automatically storing the digital content to the secure digital storage.

19. The method of claim 16, wherein determining whether the image data or the audio data includes confidential information includes comparing the image data or the audio data, respectively, to confidential information within the secure digital storage.

20. The method of claim 16, further comprising updating, by the electronic device, the one or more machine learning models based on removal of the digital content from the secure digital storage.

\* \* \* \* \*